United States Patent [19]

Markhorst

[11] 4,098,862

[45] Jul. 4, 1978

[54] PROCESS FOR THE MANUFACTURE OF POLYGONAL CARDBOARD TUBE SEGMENTS

[76] Inventor: Robert Lambertus Markhorst, Markeweg 5, Bergentheim, Netherlands

[21] Appl. No.: 704,318

[22] Filed: Jul. 12, 1976

[30] Foreign Application Priority Data

Aug. 23, 1975 [DE] Fed. Rep. of Germany ....... 2537705

[51] Int. Cl.$^2$ ........................ B29D 23/00; B29D 23/12

[52] U.S. Cl. .................................... 264/257; 156/194; 156/195; 264/294; 264/320; 264/339

[58] Field of Search ............... 264/257, 258, 322, 320, 264/291, 294, 295, 339; 156/184, 189, 190, 194, 196, 187; 162/118-122, 221-225; 249/178; 425/249, 440, 457, 417, DIG. 14

[56] References Cited

U.S. PATENT DOCUMENTS

| | | | |
|---|---|---|---|
| 219,218 | 8/1879 | Carpenter | 264/322 |
| 221,234 | 11/1879 | Ingersoll | 264/322 |
| 871,966 | 11/1907 | Stewart | 264/322 |
| 988,108 | 3/1911 | Kasralowicz | 264/257 |
| 1,219,613 | 3/1917 | Winkley | 264/322 |
| 1,284,297 | 11/1918 | Frederick | 264/258 |
| 1,471,906 | 10/1923 | Longren | 264/322 |
| 1,602,165 | 10/1926 | Parker | 264/322 |
| 1,877,628 | 9/1932 | Replogle | 264/322 |
| 3,996,086 | 12/1976 | Worrall | 156/194 |

FOREIGN PATENT DOCUMENTS

| | | | |
|---|---|---|---|
| 735,992 | 8/1955 | United Kingdom | 162/118 |

*Primary Examiner*—Willard E. Hoag
*Attorney, Agent, or Firm*—Merchant, Gould, Smith, Edell, Welter & Schmidt

[57] ABSTRACT

The invention concerns a process for the manufacture of paper-layer wound cardboard tube segments having a polygonal cross section, where paper tapes are first wound on a fixed spindle of circular shaped cross section and then the tube thus obtained is transformed into a polygonal cross section.

7 Claims, 6 Drawing Figures

PROCESS FOR THE MANUFACTURE OF POLYGONAL CARDBOARD TUBE SEGMENTS

BACKGROUND OF THE INVENTION

In manufacturing relatively robust cardboard cartons, the procedure is to wind individual layers of paper, either parallel or spiralwise, on a work core. Usually, the procedure is such that the work core is round-shaped so that the hull element obtained likewise displays a round outer profile. These types of cardboard cartons are used, for example, for storage and transportation of powdered soaps and the like.

In many applications, it is desirable that the cardboard carton display a polygonal outer profile, for example square, since this shape, relative to the possibility of stacking and space requirement for transport, is better suited than the round shape. Frequently, the square carton is also more easily hand carried.

Winding of polygonal hull elements cannot be carried out with the same speed as for round hull elements so that, in a production line, which displays the actual winding contrivance and the automatic assembler for the bottom sections and cover sections for the cartons, there is no load available for the automatic assembler. Previously, one helped himself out in the manufacture of polygonal hull elements by having several winding machines serve one automatic assembler, whereby, however, the assembly line, as compared to the assembly line for the manufacture of round hull elements, becomes highly expensive.

In a known process, the deformation of the round body to a polygonal one is effected by application of force from outside toward the inside, whereby, in no case, is a smooth surface guaranteed, but rather, with certainty, a packaging with a wavy, deformed surface is obtained.

Because of the fact that application of pressure can only be effected by auxiliary pressure rollers, it is not possible to just apply labels to the round bodies, rather labelling must be done on the polygonal body.

The processing of old, i.e. of premanufactured round bodies, is not possible, rather a continuous work process is proposed with which, without interruption of the splicing tape on through to the finished polygonal body, everything can be accomplished in one working operation.

SUMMARY OF THE INVENTION

The task set forth for the invention is to obtain an inherently stable, smooth surfaced polygonal body that can be provided with a label immediately after winding into a round shape and before transformation into a polygonal cross section.

This task set forth for the invention is solved in that the round tube is set onto an interior spindle consisting of a retractable support element of desired polygonal outer profile and the interior spindle (is then) expanded and finally, after removal from the interior spindle, the deformed hull element is dried with cold air.

By this process, the following essential technical advance, as compared to the known processes, is achieved.

It is completely irrelevant whether it is freshly wound round bodies that are being transformed into a polygonal cross section, or bodies that are already several months or even years old. That is, through means of the process in accordance with the invention, the possibility is obtained for manufacturing round bodies for stock or to draw round bodies from a completely different manufacturing plant and then transform these round bodies into a polygonal body.

In the case of the process in accordance with the invention there exists the possibility of manufacturing spiral wound round bodies, then, however, applying the label parallel wound. Spiral wound bodies, as opposed to parallel wound bodies, have advantages that can at once be seen in the higher speed of production; on the other hand, with spiral winding, the flanging of the top and bottom lateral edges can be improved since inward bending cannot occur here.

When there exists the possibility of providing the round body with a label and then transforming this body into a polygonal outer profile, there exists the advantage that the round body can be guided to the labelling machine in rolling fashion, i.e. forward feed of the round bodies to the labelling machine results because of the round bodies' own weight. No positioning of the round body inside the labelling machine is required, rather the label can be applied to the round bodies, starting from any arbitrary point. Here additionally, an essentially higher working speed is achieved and, in this manner, an essentially clean attachment of the label is guaranteed.

When the surface of the finished body is formed smooth and trouble-free, the range of application for these types of cartons is increased since these types of cartons can now also be employed for packing more refined products. Additionally, the smooth surface of the cartons implies a lesser possibility of attack, during transport, for damages and injuries so that, along with this, the appearance of the packaging can also be better maintained during transport.

Achieved with the new process is that round bodies are guided to a machine displaying deformation rams that are expandable, and indeed, expandable in the desired polygonal outer profile. By expansion of the supporting spindles in the desired outer profile, the round body is deformed and, simultaneously, the material is put under tension, whereby an increase of up to 2 mm in the circumference of the body occurs. This tension in the body ensures that the outer surface of the body is completely smooth and, thereby, in that the deformation process of the round body into the polygonal one, in contrast to the processes known up until now, occurs not from the outside but rather from the inside, it is possible to apply the label to the round body and then to process this body further.

Preferably, the hull element is moistened on its inner side prior to setting it onto the interior spindle, whereby this moistening process can still be improved and accelerated in that, after moistening the inner side of the hull element, this inner side is heated. Because of the heating, a very rapid penetration of the body element with the applied humidity occurs so that the deformation process into the polygonal outer profile can be greatly increased — if necessary inside a heating chamber.

Furthermore, in accordance with the invention, it has proven to be advantageous that the outside of the polygonally deformed hull element be braced during cold air drying.

Moistening of the inner side of the hull element can be omitted if, during the winding process, the hull element displays an already sufficient humidity content because of the adhesive substance, or the like, that is introduced.

Further, it is essential that, after carrying out the deformation process, the drying process be carried out with cold air, since it has been shown that by using cold air a very rapid, and above all an inherently stable, drying of the hull element occurs.

BRIEF DESCRIPTION OF THE DRAWINGS

For a better understanding, the invention will be explained briefly, in conjunction with the drawings. In the drawings.

DESCRIPTION OF THE PREFERRED EMBODIMENT

Figure 1A:
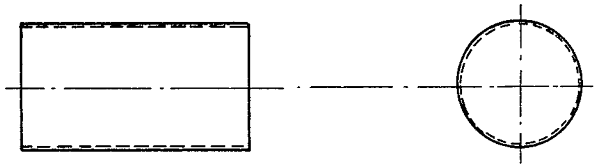
FIG. 1 shows schematically the various work stations and, FIG. 2 shows schematically a machine for carrying out the process.
Figure 1B:
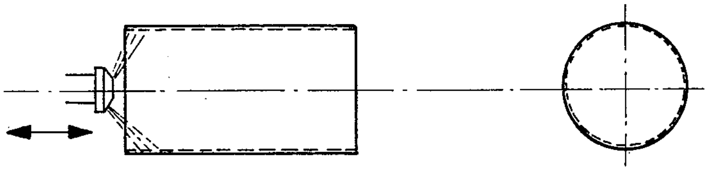
Figure 1C:
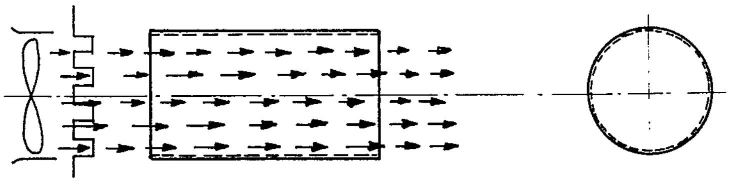

Represented at FIG. 1*a* is a simple, round cardboard tube segment. Carried out at FIG. 1*b* is a moistening of this cardboard tube segment, at FIG. 1*c* heating of the cardboard tube segment, and at FIG. 1*d* deformation of the previously round cardboard tube segment into a polygonal, for example square, body. Provided here as deformation spindles are two essentially U-shaped support elements 1 and 2.

Figure 1D:
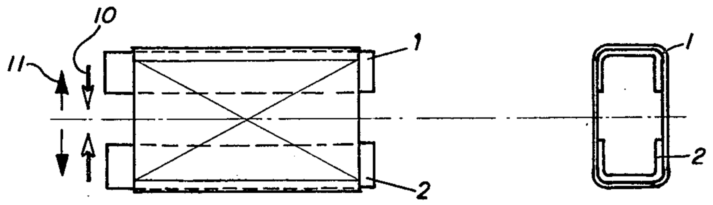
Figure 1E:
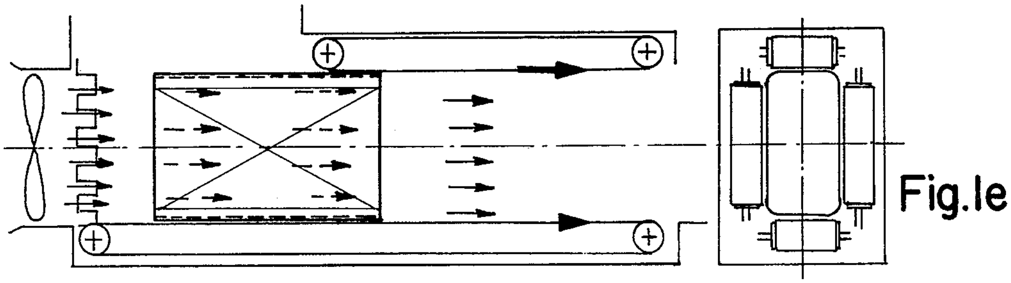

The arrows in FIG. 1*d* illustrate the relative movement of support members 1 and 2 between expanded and retracted positions. In particular, arrows 10 represent the movement of support elements 1 and 2 to a retracted position in which the tube segment is placed on support elements 1 and 2. Arrows 11 represent the movement of support elements 1 and 2 to an expanded position thereby deforming the tube segment into the desired polygonal shape. It is to be understood that any conventional drive means (not shown) for imparting relative movement to support elements 1 and 2 may be utilized in the present invention. At FIG. 1*e* the polygonal body is now dried with cold air, and the shape thereby stabilized.

Figure 2:
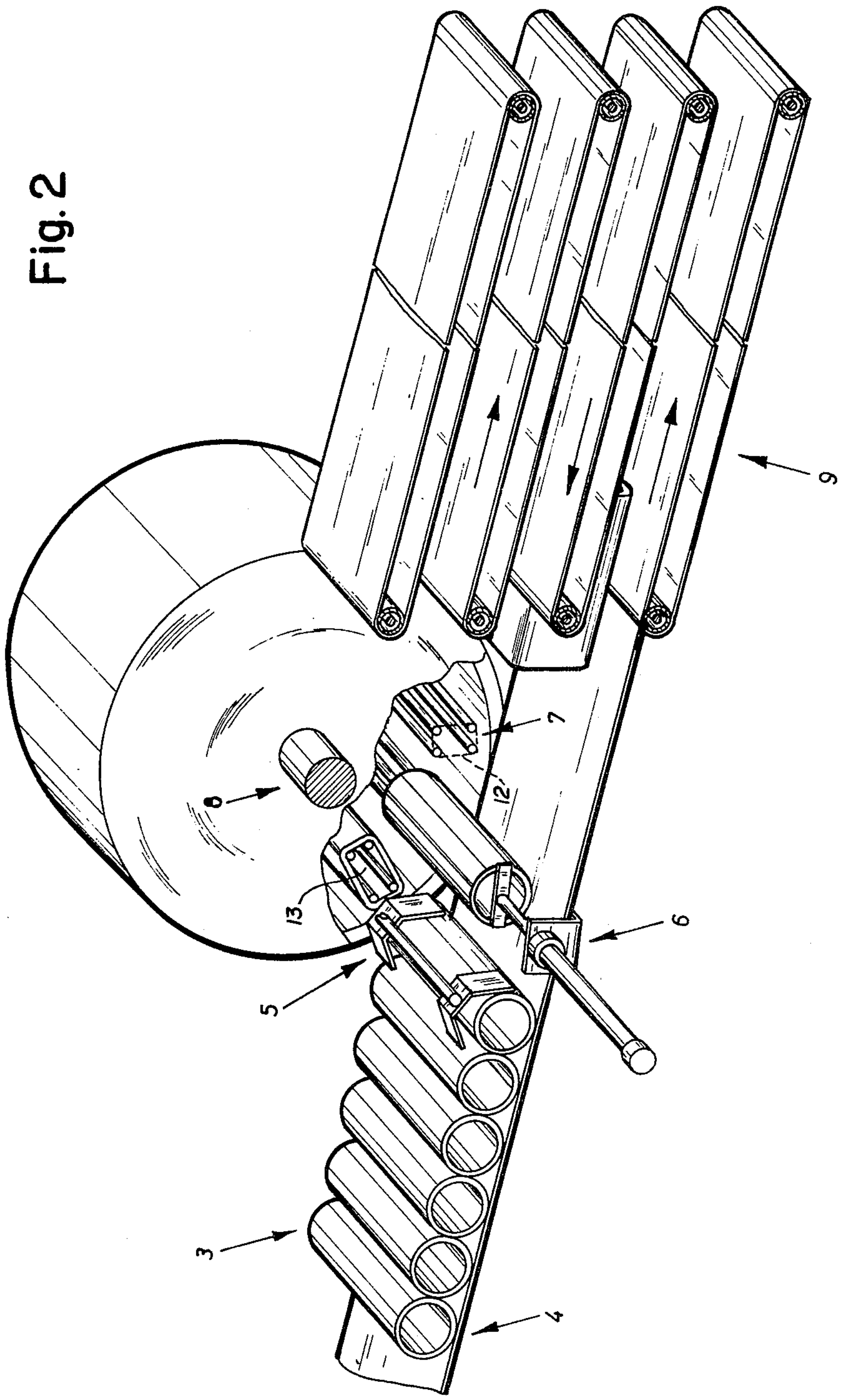

Represented in FIG. 2 is an arrangement for carrying out the process that is in accordance with the invention. The round cardboard elements 3 arrive at a separating contrivance 5 on a conveyor belt 4, and from there to a ram 6 that can be actuated hydraulically, pneumatically, or however, pushing the round element onto the support spindles 7. These support spindles are on a disk rotating about the shaft 8. It can be seen that support spindles 7 define a polygonal outer profile as shown by the dotted line 12. After pushing the elements onto the support spindles, the disk rotates to a next work station 13 and the support spindles are expanded as described with reference to FIG. 1*d* and the element is thereby deformed into a square body. A heating contrivance, which however is not absolutely required, can be provided in the top portion of the rotating disk. Finally, the elements leave the support spindles and reach a transport contrivance 9 in which they are cooled with cold air, wherein the facilities for introducing the cold air, and the support elements for bracing the polygonal bodies in shape are not shown, for the sake of clarity.

What is claimed is:

1. In a process for the manufacture of paper-layer wound tube segments having a substantially rectangular cross section, where paper strips are first wound on a flexible spindle of circular shaped cross section and then the tube thus obtained is transformed into a substantially rectangular cross section, the improvement comprising the steps of setting the round tube onto an interior spindle consisting of a pair of cooperating expandable support elements, each support element comprising a substantially U-shaped member, the outer profile of said elements defining a desired substantially rectangular profile, said support elements movable between a first retracted position for insertion of said tube thereon and a second expanded position wherein said tube is deformed into said desired substantially rectangular profile, expanding the support elements and finally, after removal from the interior spindle, drying the deformed substantially rectangular tube segment with cold air.

2. A process in accordance with claim 1 wherein the outer sides of the substantially rectangular tube segment are braced during cold air drying.

3. A process in accordance with claim 1 wherein the tube is moistened on its inner side before setting it onto the interior spindle.

4. A process in accordance with claim 3 wherein, after moistening the inner side of the tube, the inner side is heated.

5. In a process for the manufacture of paper-layer wound tubes having a substantially rectangular cross section, where paper strips are first wound on a flexible spindle of circular shaped cross section and then the tube thus obtained is transformed into a substantially rectangular cross section, the improvement comprising the steps of sliding the round tube onto an interior spindle comprising a pair of cooperating expandable support elements, each element comprising a substantially U-shaped member, the outer profile of said elements defining a desired substantially rectangular profile, said support elements movable between a first retracted position for sliding of said tube thereon and a second expanding position wherein said tube is deformed into said desired substantially rectangular profile, expanding the support elements to deform the round tube into the desired substantially rectangular cross section, removing the tube from the interior spindle, and drying the deformed tube.

6. A process in accordance with claim 5 wherein the round tube is moistened on its inner side and then heated before it is placed on the interior spindle.

7. A process in accordance with claim 6 wherein the deformed tube is dried with cold air and is braced during the drying step.

* * * * *